UNITED STATES PATENT OFFICE.

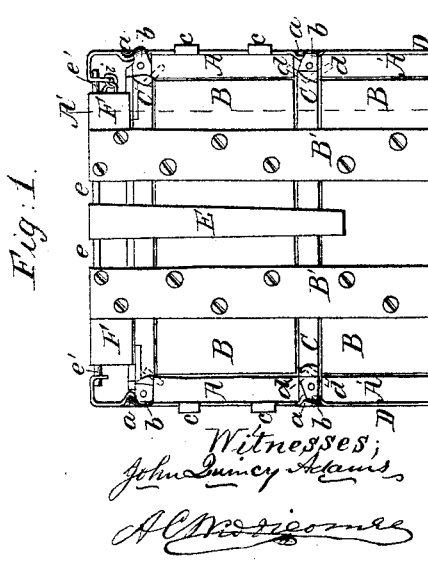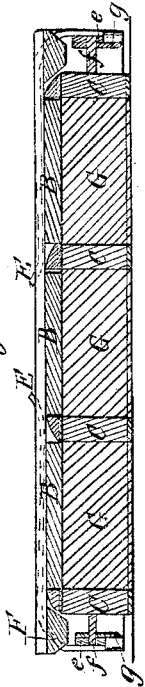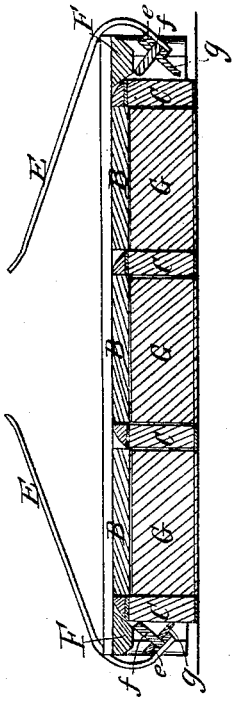
J. A. Hamer,
Brick Mold,
No. 26,736. Patented Jan. 3, 1860.
Fig. 3.
Fig. 4.
Fig. 1.
Fig. 2.
Witnesses;
John Quincy Adams
Inventor:
James A. Hamer.
By his Attorney.
Thos. H. Dodge

JAMES A. HAMER, OF READING, PENNSYLVANIA, ASSIGNOR TO HIMSELF, AND NORRIS MARIS, OF KIMBERTON, PENNSYLVANIA.

BRICK-MOLD.

Specification of Letters Patent No. 26,736, dated January 3, 1860.

*To all whom it may concern:*

Be it known that I, JAMES A. HAMER, of Reading, in the county of Berks, in the State of Pennsylvania, have invented certain new and useful Improvements in Brick-Molds; and I do hereby declare that the following is a full, clear, and exact description thereof, reference being had to the accompanying drawings, and to the letters of reference marked thereon, forming a part of this specification, in which—

Figure 1, represents a top or plan view of the mold; Fig. 2, a side view of the mold; Fig. 3, a section on line A, B, Fig. 1 showing the molded brick; and Fig. 4, a similar view with the handles or levers E, E, partially raised.

The nature of my invention consists, first, in combining vulcanized india-rubber or its equivalent, between the end and side pieces of the mold, and second, in the peculiar mechanism for operating the sides, tops, and ends of the mold conjointly.

The mold is composed of side pieces D, to which are permanently attached the end pieces A, A', while the end pieces A, A, of the end molds are fastened to slides $c, c$, both above and below the side pieces D. The side pieces D, are provided with a series of inclines $a$, on both edges, while the division pieces C, are provided with a series of hooks or grooves $b$, which work on the inclines $a$, of the side pieces D.

Between each end piece, and the end of the division piece C, which comes in contact with it, is inserted a piece of vulcanized india-rubber $d$, see dotted lines Fig. 1.

The tops of the molds B, are all fastened to pieces B', so that when the pieces B', are raised, the tops of the molds are raised with them. To each end of the pieces B', is attached a lifting piece F.

The lever or lifting and pressing arms E, E, are attached to pieces $e, e$, which turn in the ends of the side pieces D, as shown at $e, e$, Fig. 1. Cams or projections $f$, and $g$, are also attached to the ends of the pieces $e, e$.

The tops B, B, of the molds are prevented from falling off or of becoming detached by use, by means of the links $i, i$.

The operation is as follows, viz: The levers or lifting and pressing arms E, E, being folded down on the tops B, as shown in Fig. 1, the mold is turned and properly filled with clay, when the mold is again turned so as to bring the open sides down, as shown in Fig. 3.

The levers E, E, are now raised and as the cams $f$, are turned up, as shown in Fig. 4, so as not to press against the outer divisions C, the pieces of rubber $d$, expand and force the sides of the mold away from the molded bricks G, while by means of the grooved ends $b$, of the divisions C, working on the inclines $a$, of the sides D, the ends A and A', of the molds are also forced from in contact with the molded bricks G, and as the levers are raised still more the cams $f$, come in contact with the lifting cams or pieces F, and raise the tops B, from the molded bricks, after which the mold is raised leaving the molded bricks in a smooth and perfect condition. To insure accuracy in molding bricks from some qualities of clay, it may be well to raise the levers E, so as to bring the cams $g$, against the divisions C, thereby forcing all of the divisions C, against the sides of the bricks again, and then by turning the levers E, still farther back, allow them to be separated again by the expansion of the rubber springs $d$.

It will be noticed that in the mold above described, only three bricks are molded at a time, but the molds may be so arranged as to mold more than three if preferred.

The rubber springs can be inserted in a different manner, provided they perform the same result.

The end divisions C, it will be observed, move in reverse directions, that is, they slide on the side pieces D, from the ends of the center mold, which are attached to and move with the side pieces D.

The distance which each division and end piece slides is regulated by the length of the inclines $a$, and the amount of rubber used in the springs.

The levers or arms E, could be made larger and allowed to lap by each other if preferred.

By the above construction, I am able to produce an expanding mold of much utility and great durability. The rubber springs are not liable to get out of order while they make perfect and tight joints when the ends of the molds are pressed together by folding down the arms or levers E, E, so as to bring the cams $f, f$, against the two outer divisions or pieces C, and the arms or levers E, E, upon the tops B. The mold may be made out of any suitable material.

Having described my improved brick mold, what I claim as new and desire to secure by Letters Patent, is—

1. The interposition of vulcanized rubber or its equivalent between the ends and sides of the mold, substantially as and for the purposes set forth.

2. The combination and arrangement of the cams $f$, $f$, levers or arms E, E, inclines $a$, and grooves $b$, with the sides and ends of the mold substantially as and for the purposes set forth.

3. The secondary cams $g$, $g$, in combination with the outer division pieces of the mold, as and for the purposes set forth.

JAMES A. HAMER.

Witnesses:
H. P. QOHN,
DAVID EUEN.